United States Patent [19]

Kaku et al.

[11] Patent Number: 5,185,823
[45] Date of Patent: Feb. 9, 1993

[54] WAVEGUIDE TYPE OPTICAL DEVICE

[75] Inventors: Ryoji Kaku; Hiroyuki Takahashi; Eiichi Asami, all of Tokyo, Japan

[73] Assignee: Japan Aviation Electronics Industry Limited, Tokyo, Japan

[21] Appl. No.: 804,062

[22] Filed: Dec. 9, 1991

[30] Foreign Application Priority Data

Dec. 13, 1990 [JP] Japan ............................ 2-401956
Jul. 10, 1991 [JP] Japan ............................ 3-169819

[51] Int. Cl.[5] ............................ G02B 6/10; G02B 5/30
[52] U.S. Cl. ............................ 385/2; 385/11
[58] Field of Search ............................ 385/2, 8, 11

[56] References Cited

U.S. PATENT DOCUMENTS

| | | | |
|---|---|---|---|
| 4,778,234 | 10/1988 | Papuchon et al. | 385/11 |
| 4,887,878 | 12/1989 | Robinson et al. | 385/2 |
| 4,966,431 | 10/1990 | Heismann | 385/11 |
| 5,050,948 | 9/1991 | Hawkins, II et al. | 385/2 |

Primary Examiner—Akm E. Ullah
Attorney, Agent, or Firm—Pollock, VandeSande and Priddy

[57] ABSTRACT

In a waveguide type optical device which has an optical waveguide and modulation electrodes for varying its refractive index, both formed in the top of a substrate and a ferroelectric crystal having a pyroelectric effect, the top of the crystal substrate being parallel to the direction of its spontaneous polarization, conductive films are formed in two surfaces of the crystal substrate which cross the direction of the spontaneous polarization. The conductive films are electrically interconnected to thereby prevent a change in the operating temperature characteristic of the optical device which is caused by the pyroelectric effect of the crystal substrate.

6 Claims, 3 Drawing Sheets

WAVEGUIDE TYPE OPTICAL DEVICE

BACKGROUND OF THE INVENTION

The present invention relates to a waveguide type optical device which has an optical waveguide and electrodes formed in a substrate of a ferroelectric crystal which has a pyroelectric effect.

Waveguide type optical devices utilizing an electrooptic effect are a phase modulator, an intensity modulator, an optical switch and so forth. In the case of using, for an optical device, a crystal as of lithium niobate ($LiNbO_3$) which has a pyroelectric effect, i.e. an effect that spontaneous polarization varies with temperature change, however, the operation of the optical device becomes unstable due to unnecessary electric fields resulting from the generation of electric charges in the crystal surfaces which cross the direction of spontaneous polarization.

FIG. 1 is a diagrammatic showing of a conventional waveguide type optical device 10 having its substrate 11 formed of lithium niobate crystal, for explaining its unstable operation due to a temperature change. The crystal substrate 11 has X-surfaces X1, X2, Y-surfaces Y1, Y2 and Z-surfaces Z1, Z2 perpendicular to the X, Y and Z axes, respectively, and the direction of spontaneous polarization P of the crystal is assumed to be the Z-axis direction. The X-surfaces X1 and X2 in the drawings will be referred to also as the top and bottom surfaces, respectively. An optical waveguide 12 and modulation electrodes 13 and 14 are formed in a surface parallel to the direction P of spontaneous polarization, i.e. in the X-surface X1 in this example. Light which propagates in the optical waveguide 12 is phase modulated by an electrooptic effect (i.e. by the Pockels effect) in accordance with a voltage which is applied to the electrodes 13 and 14.

In a steady state in which the optical device 10 is held at a fixed temperature, polarization charges in the Z-surfaces Z1 and Z2 are neutralized by stray charges in the air which stick to the polarization charges. A temperature change of the crystal substrate 11 causes a change in the amount of polarization, and as a result, positive and negative surface charges develop in the Z-surfaces Z1 and Z2 (which generally, are surfaces crossing the direction of polarization P at an arbitrary angle and which are called polarization planes), respectively, generating electric fields as indicated by their electric lines of force Ef. The resultant electric fields are applied to the optical waveguide 12 directly or indirectly through the electrodes 13 and 14. This changes the phase of the light propagating through the waveguide 12, as is the case with the modulation drive voltage which is applied to the modulation electrodes 13 and 14, and hence is a cause of the unstable operation of the optical device accompanying the temperature change.

With such a structure as shown in FIG. 2, in particular, in which the ferroelectric crystal substrate 11 in FIG. 1 is mounted on a mount 30 having a substantially equal coefficient of thermal expansion, and terminal electrodes 33 and 34 are provided on the marginal portions of the mount 30 along the planes of polarization (i.e. the Y-surfaces Y1 and Y2) and connected by bonding wires 31 and 32 to the modulation electrodes 13 and 14, respectively, so that the terminal electrodes 33 and 34 are each supplied with the modulation drive voltage, the electric lines of force Ef of electric charges resulting from polarization are readily caught by the bonding wires 31 and 32, and consequently, the modulation electrodes 13 and 14 are supplied with a voltage produced by the pyroelectric effect.

In Japanese Application Laid Open No. 73207/87 entitled "Waveguide Type Optical Device" an arrangement is proposed for preventing deterioration of the temperature characteristic of the optical device caused by its pyroelectric effect. According to this prior art literature, a slightly conductive film is formed between the electrodes to that prevent that electric charges generated by the pyroelectric effect from remaining in the electrode portions. With such a structure, however, there is a possibility that if the resistance value of the film is too low, the device will be destroyed by a large current which flows between the electrodes when the electric fields are applied. On the other hand, when the resistance value of the film is too high, the charges caused by the pyroelectric effect cannot completely be driven out of the electrode portions, and hence the intended object cannot be attained. Moreover, if the insulation between the electrodes is lowered by the film, then no effective electric fields are applied to the optical waveguide, resulting in the reduction of the modulation efficiency. Besides, variations in the resistance value of the film lead to variations in the modulation characteristic.

SUMMARY OF THE INVENTION

It is therefore an object of the present invention to provide a waveguide type optical device whose temperature characteristic is less affected by the pyroelectric effect of the optical device.

The waveguide type optical device according to a first aspect of the present invention includes: optical waveguide means and modulation electrode means for changing the refractive index thereof, both formed in a first surface of the ferroelectric crystal substrate parallel to the direction of polarization; first and second conductive films respectively formed in second and third surfaces of the crystal substrate which cross the direction of polarization; and connection means for electrically interconnecting the first and second conductive films.

In the above, the connection means may be means for connecting the first and second conductive films to a common ground, or a short-circuit conductive film formed in a fourth surface of the crystal substrate opposite the first surface thereof and having its two ends connected to the first and second conductive films.

By electrically interconnecting the first and second conductive films, it is possible to neutralize the surface charges caused by spontaneous polarization due to a temperature change; hence, the temperature stability of the optical device is improved far more than in the past.

According to a second aspect of the present invention, a ferroelectric crystal substrate having an optical waveguide and modulation electrodes formed on both sides thereof is mounted on a mount which has a planar surface larger than that of the substrate. Terminal electrodes are provided on the marginal portion of the mount along one or both of the side surfaces of the ferroelectric crystal substrate crossing the planes of polarization and the planar surface of the mount. The modulation electrodes and the terminal electrodes are interconnected by bonding wires extended over the above-mentioned side surface or surfaces of the ferroelectric crystal substrate.

DESCRIPTION OF THE PREFERRED EMBODIMENTS

Figure 1:
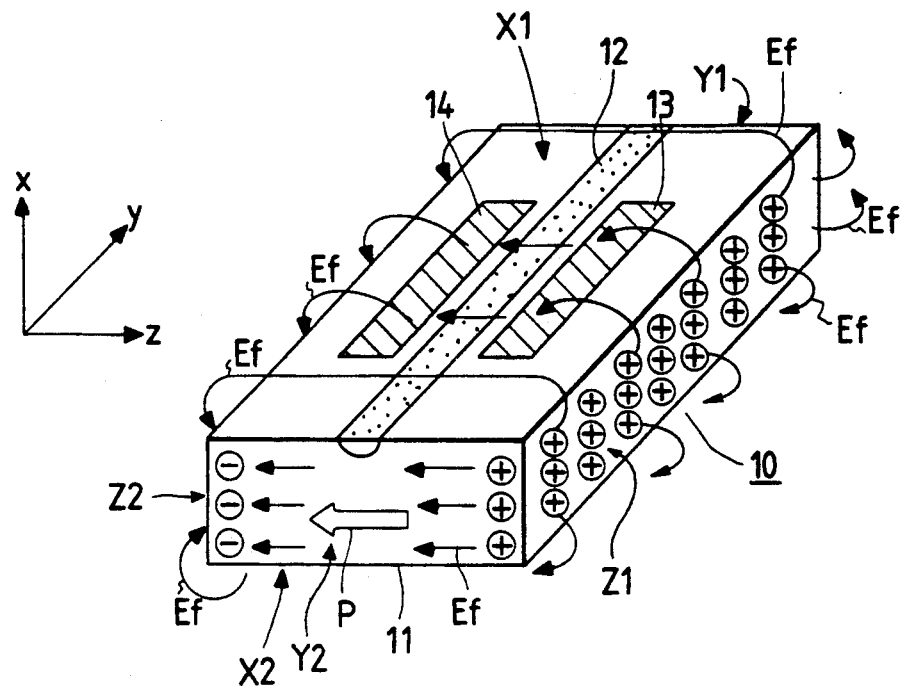
FIG. 1 is a perspective view showing an example of a conventional waveguide type optical device.
Figure 3:
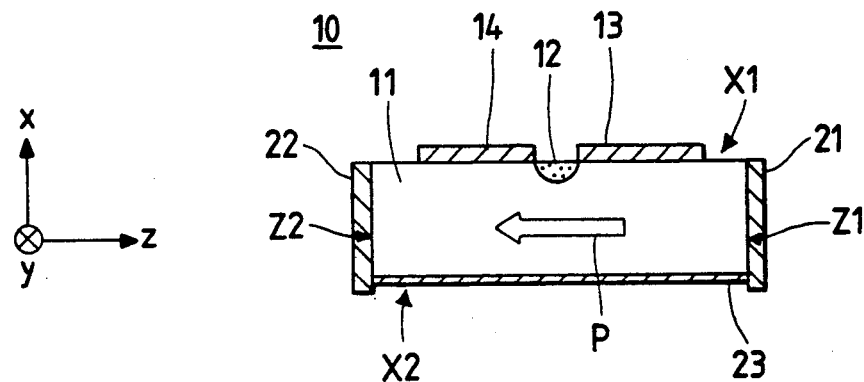
FIG. 3 is a sectional view illustrating an embodiment according to the first aspect of the present invention.

Since the waveguide type optical device 10 according to a present invention can be made to have an outward form of a flat parallelepiped as is the case with the prior art example depicted in FIG. 1, embodiments of the invention described hereinbelow are shown only in section in parallel to the Y-surface of the crystal substrate. FIG. 3 is a schematic representation of an embodiment according to the first aspect of the invention, in which the parts corresponding to those in FIG. 1 are identified by the same reference numerals. Also in this embodiment, there are formed, in the top surface X1 of the crystal substrate 11 of a ferroelectric substance (lithium niobate, for example) parallel to the direction of spontaneous polarization P, the straight optical waveguide 12 and the modulation electrodes 13 and 14 disposed adjacent both sides for varying its refractive index. One of the features of the present invention is that the entire areas of the Z-surfaces Z1 and Z2 of the crystal substrate 11 (in general, a plurality of surfaces crossing the direction of spontaneous polarization P) are covered with conductive films 21 and 22, respectively. Furthermore, the FIG. 3 embodiment includes, as means for shorting the conductive films 21 and 22, a shorting film or conductor 23 formed in the bottom surface X2 of the crystal substrate 11 and electrically connected at both ends to the conductive films 21 and 22, respectively. With such a structure, even if positive and negative charges are generated in the Z-surfaces Z1 and Z2 of the substrate 11 by a temperature change, they neutralize each other via the shorting conductor 23 and no electric field is formed, so that no influence is exerted on the refractive index of the optical waveguide 12.

Figure 4:
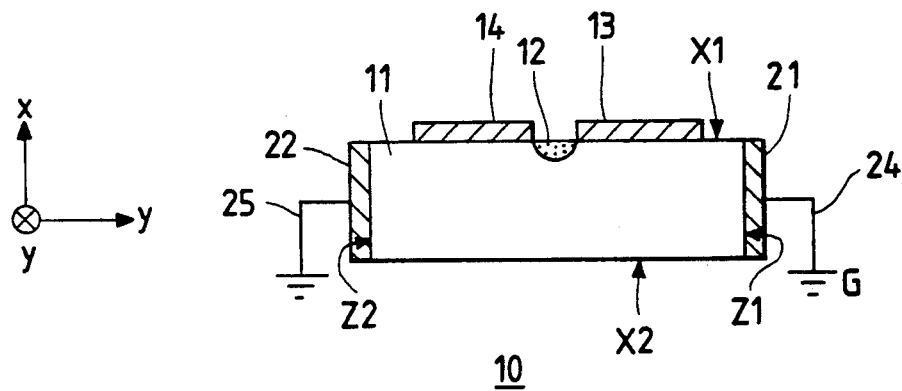
FIG. 4 is a sectional view illustrating a modification of the embodiment of FIG. 3.

FIG. 4 illustrates a modification of the embodiment of FIG. 3, which is the same as the FIG. 3 embodiment in that the Z-surfaces Z1 and Z2 of the substrate 11 are covered with the conductive films 21 and 22, but different therefrom in that the conductive films 21 and 22 are electrically interconnected by connecting them to a common ground G, i.e. a common potential point, by lead wires 24 and 25, instead of forming a shorting conductive film 23 in the bottom surface X2 of the substrate 11 therefor.

Figure 5:
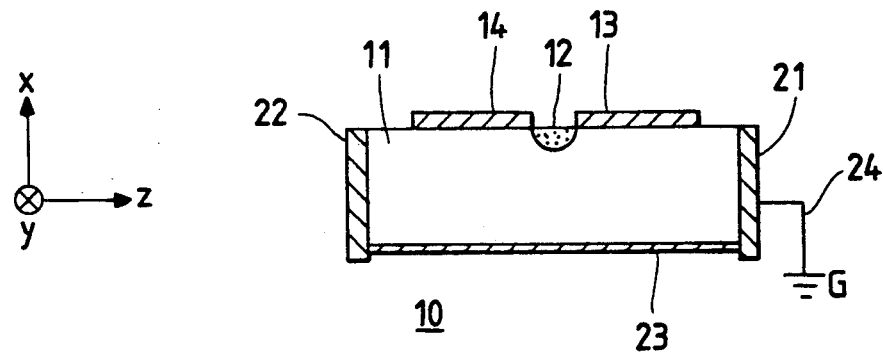
FIG. 5 is a sectional view illustrating still another modification of the embodiment of FIG. 3.

Incidentally, it is evident that the conductive films 21 and 22 and the shorting conductor 23 in FIG. 3 may be grounded at arbitrary points as required. This is exemplified in FIG. 5, in which the conductive film 21 is grounded at one point.

The material for the conductive films 21 and 22 needs only to permit migration of electric charges and may also be semiconductive, and its conductivity is not critical. The conductive films 21 and 22 can easily be formed, for example, by coating a conductive point or evaporating metallic films. The shorting conductor 23 can similarly be formed but may also be replaced with a conductive wire.

Figure 2:
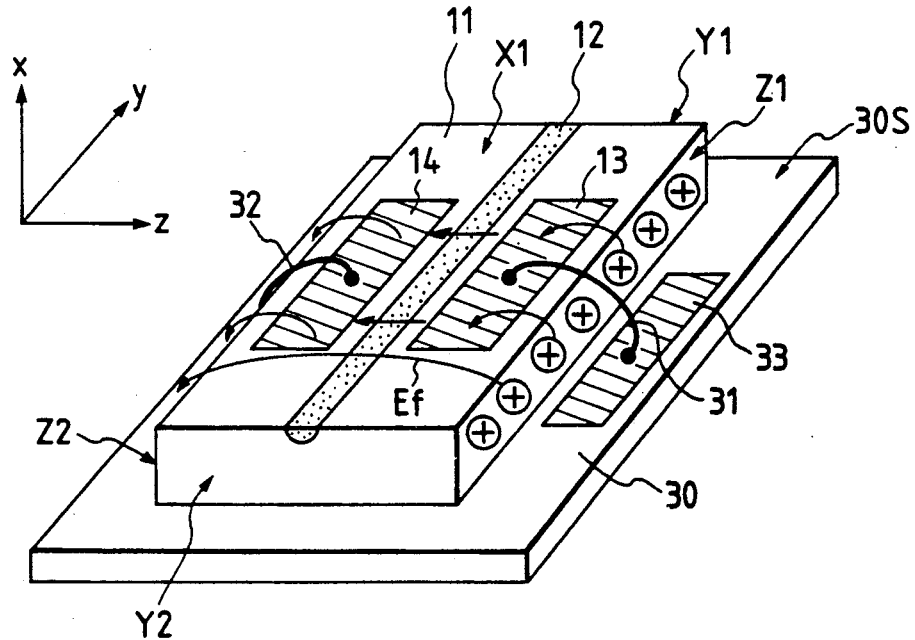
FIG. 2 is a perspective view showing a prior art waveguide type optical device which is formed by mounting the ferroelectric crystal substrate of FIG. 1 on a mount.
Figure 6:
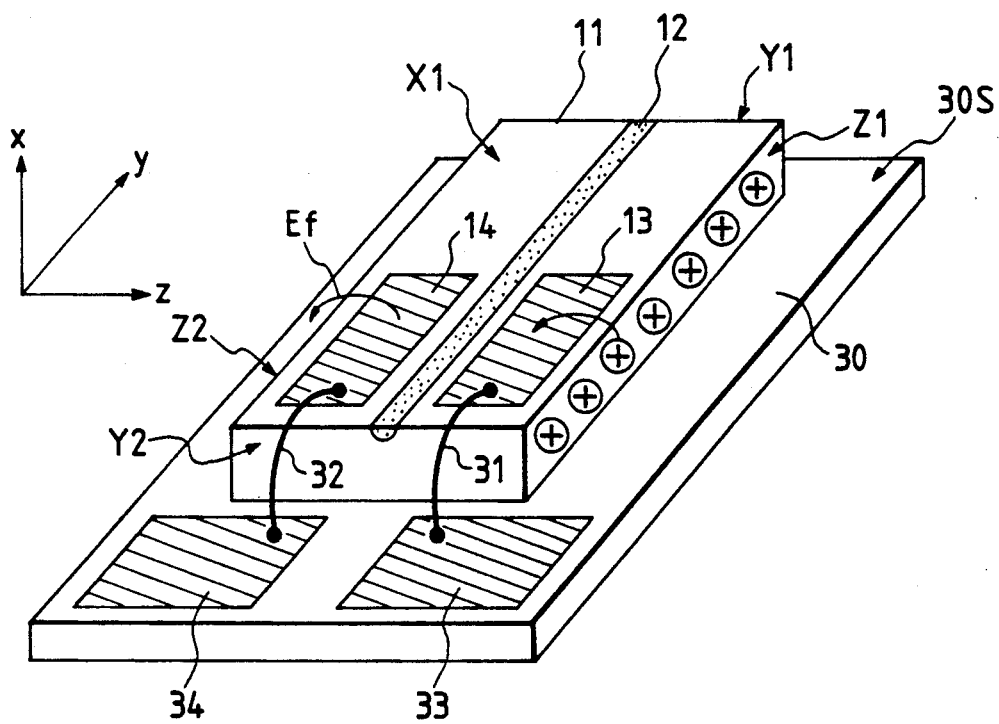
FIG. 6 is a perspective view illustrating an embodiment according to the second aspect of the invention.

FIG. 6 illustrates an embodiment of the waveguide type optical device according to the second aspect of the present invention. The ferroelectric crystal substrate 11, which has the optical waveguide 12 and the modulation electrodes 13 and 14 formed on both sides thereof, as is the case with the prior art example of FIG. 2, is mounted on a mount 30 which has a planar surface 30S larger than that of the substrate 11. The mount 30 is a square plate or block of a material which is the same as that of the substrate 11 or different therefrom but substantially equal thereto in the coefficient of thermal expansion. Terminal electrodes 33 and 34 are formed in the marginal portion or portions of the planar surface 30S of the mount 30 along one or both of Y-surfaces Y1 and Y2 of the ferroelectric crystal substrate 11 perpendicular to the polarization planes Z1 and Z2 thereof, in this embodiment along the Y-surface Y2. Bonding wires 31 and 32 are extended from the terminal electrodes 33 and 34 over the Y-surface Y2 and are connected to the modulation electrodes 13 and 14, respectively.

Thus, the bonding wires 31 and 32 do not extend over the polarization planes Z1 and Z2, and hence hardly catch the electric lines of force caused by the pyroelectric effect. This structure permits realization of a waveguide type optical device which is far less affected by temperature change than the optical device depicted in FIG. 2. It is also possible to form one of the terminal electrodes 33 and 34 in the marginal portion of the planar surface 30S of the mount 30 along the Y-surface Y1 of the crystal substrate 11 and connect it to the corresponding one of the modulation electrodes 13 and 14 by a bonding wire extended over the Y-surface Y1. Moreover, any one of the embodiments shown in FIGS. 3 through 5 may also be combined with the FIG. 6 embodiment.

As described above, according to the first aspect of the present invention, in the optical device which has the optical waveguide and the electrodes for the modulation thereof formed in one surface of the ferroelectric crystal substrate parallel to the direction of spontaneous polarization, conductive films are formed on a plurality of surfaces of the substrate which are charged by spontaneous polarization and the conductive films are electrically interconnected. With such a structure, since charges generated in the plurality of surfaces of the substrate can be neutralized by each other, no electric field develops—this precludes the possibility of the refractive index of the optical waveguide being affected by such changes and hence prevents the deterioration of the temperature characteristic of the optical device which is caused by the pyroelectric effect. Moreover, according to the present invention, there is no of reducing the insulation resistance between the modulation electrodes which leads to the degradation of the modulation characteristic.

According to the second aspect of the present invention, the modulation electrodes are connected to the terminal electrodes formed on the marginal portion of the mount, by bonding wires extended from the former over the side surface or surfaces of the ferroelectric crystal substrate which cross the planes of polarization. This structure affords substantial reduction of electric lines of force due to electric charges caused by the pyroelectric effect which are caught by the bonding wires.

It will be apparent that many modifications and variations may be effected without departing from the scope of the novel concepts of the present invention.

What is claimed is:

1. A waveguide type optical device having improved temperature stability, comprising:

a substrate of a ferroelectric crystal having a pyroelectric effect, said crystal substrate having spontaneous polarization, a first surface parallel to the direction of said spontaneous polarization, and second and third surfaces crossing the direction of said spontaneous polarization;

an optical waveguide formed in said first surface of said ferroelectric crystal substrate;

modulation electrode means formed in said first surface of said ferroelectric crystal substrate and extending along said optical waveguide on both sides thereof;

first and second conductive films formed almost all over said second and third surfaces of said ferroelectric crystal substrate crossing the direction of said spontaneous polarization; and short-circuit means for electrically interconnecting said first and second conductive films, whereby charges caused by the pyroelectric effect of said crystal substrate cancel one another.

2. The optical device of claim 1, wherein said short-circuit means is a shorting conductor formed in a fourth surface of said ferroelectric crystal substrate opposite said first surface and connected at both ends to said first and second conductive films, respectively.

3. The optical device of claim 1, wherein said short-circuit means includes first and second lead wires connected at one end to said first and second conductive films, respectively, and connected at their other ends to a common potential point.

4. The optical device of claim 2, wherein at least one of said first and second conductive films is grounded.

5. A waveguide type optical device having improved temperature stability, comprising:

a substrate of a ferroelectric crystal having a pyroelectric effect, said crystal substrate having spontaneous polarization, a first surface parallel to the direction of said spontaneous polarization, second and third surfaces intersecting the direction of said spontaneous polarization, a fourth surface parallel to said first surface, and two side surfaces each of which intersects said first, second, third and fourth surfaces;

an optical waveguide formed in said first surface of said ferroelectric crystal substrate;

first and second modulation electrodes formed in said first surface of said crystal substrate extending along said optical waveguide on both sides thereof;

a mount which has a planar surface larger than said fourth surface of said ferroelectric crystal substrate and on which said ferroelectric crystal substrate is mounted, said fourth surface lying on said planar surface of said mount, said mount having a thermal expansion coefficient substantially equal to that of said ferroelectric crystal substrate;

first and second terminal electrodes formed in at least one marginal portion of said planar surface of said mount along at least one of said side surfaces of said ferroelectric crystal substrate; and first and second bonding wires which extend over at least one or said side surfaces of said ferroelectric crystal substrate in a direction substantially perpendicular to the direction of spontaneous polarization of said substrate, for interconnecting said first and second terminal electrodes and said first and second modulation electrodes, respectively.

6. The waveguide type optical device of claim 5 which further comprises first and second conductive films formed almost all over said second and third surfaces of said ferroelectric crystal substrate, and short-circuit means for electrically interconnecting said first and second conductive films.

* * * * *